Figure 3:
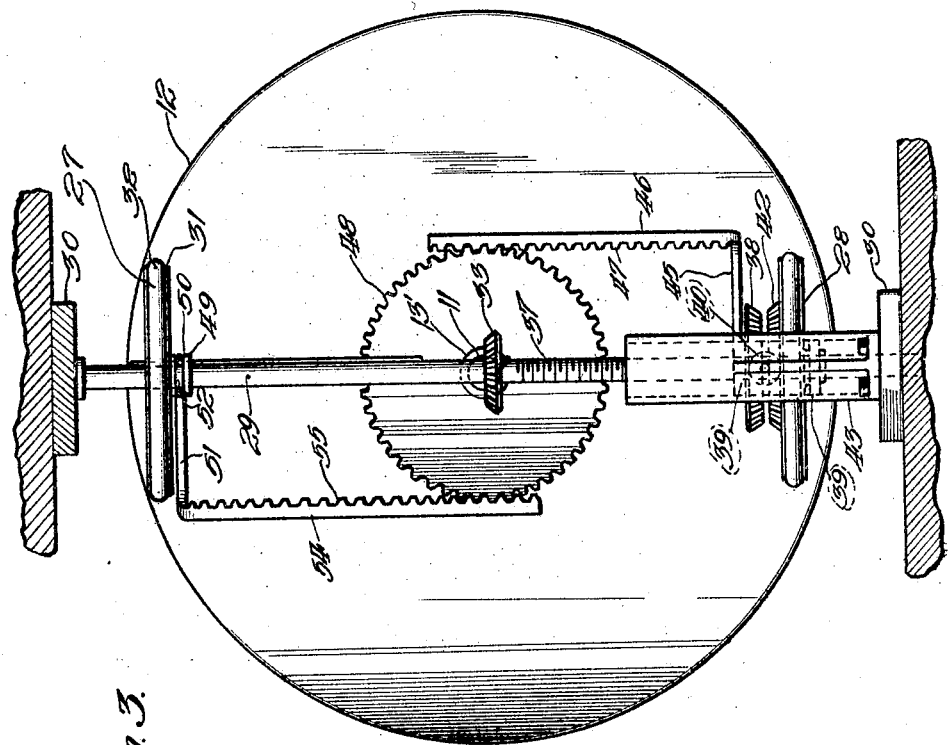

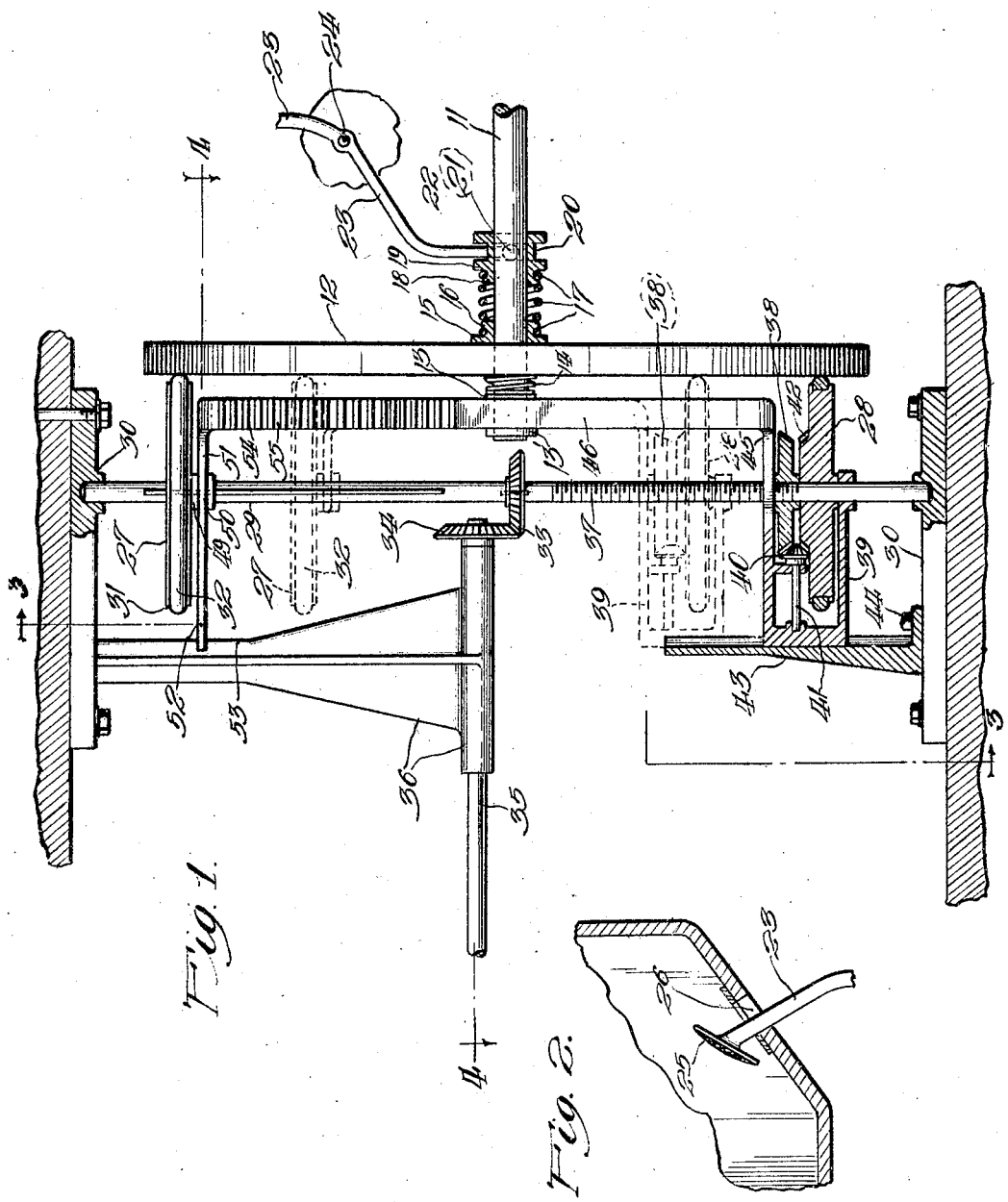

C. H. GILL.
FRICTION TRANSMISSION MECHANISM.
APPLICATION FILED APR. 17, 1920.

1,410,747.

Patented Mar. 28, 1922.
3 SHEETS—SHEET 2.

Witness:
Stephen T. Kebne

Inventor.
Charles H. Gill

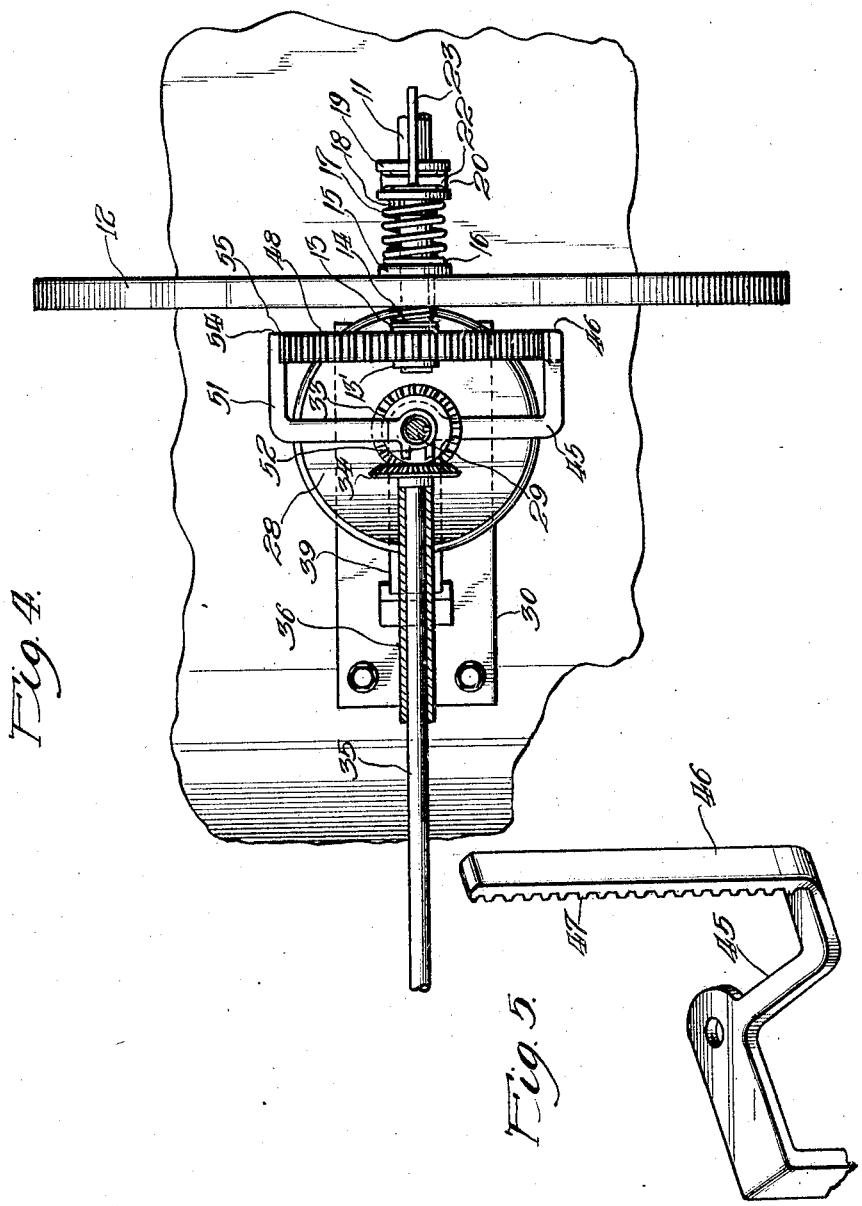

UNITED STATES PATENT OFFICE.

CHARLES H. GILL, OF CHICAGO, ILLINOIS.

FRICTION TRANSMISSION MECHANISM.

1,410,747.  Specification of Letters Patent.  Patented Mar. 28, 1922.

Application filed April 17, 1920. Serial No. 374,683.

*To all whom it may concern:*

Be it known that I, CHARLES H. GILL, a citizen of the United States, residing in Chicago, in the county of Cook and State of Illinois, have invented certain new and useful Improvements in Friction Transmission Mechanism, of which the following is a specification.

My invention relates to speed changing mechanism for controlling the speed of rotation of a driven shaft relative to the speed of rotation of a driving shaft and for automatically changing the relative speed of said driven shaft to conform inversely to varying degrees of resistance offered to the rotation of the said driven shaft. My invention is primarily intended to replace the usual speed changing gears of automobiles but will be found useful in many other types of machinery. While illustrated and described herein as applied to or constructed for use in an automobile, it is evident that it is equally applicable for many other uses.

The objects of my invention are, first, to provide a frictional speed changing mechanism; second, to provide automatic means for adjusting the relative speeds of the driving and driven members of said mechanism to meet varying running conditions; and, third, to provide means under the control of the operator for varying the relative speeds of said driving and driven members without interference with the simultaneous automatic operation of the aforesaid automatic adjusting means.

I attain these objects by the mechanism illustrated in the accompanying drawings, in which—

Figure 1 is a side elevation of the whole mechanism, with the exception of the foot pedal and a portion of the pedal lever; Figure 2 is a side elevation of the foot pedal and portion of the pedal lever, with a part of the floor and footboard of an automobile shown in section; Figure 3 is a section and rear elevation taken on the line 3—3 of Figure 1; Figure 4 is a plan view taken on the line 4—4 of Figure 1; and Figure 5 is a detail view in perspective of one of the racks and its carrying arm.

Similar numerals refer to similar parts throughout the several views.

11 designates a shaft driven by a motor (not shown) and said shaft carries a friction disk 12 mounted upon said shaft in such manner as to be rotatable with said shaft but keyed upon it to permit of longitudinal sliding motion upon said shaft. A collar 13 is fixed to the shaft 11 and a spiral spring 14 surrounds the said shaft between the collar 13 and the disk 12, tending to force the disk 12 along the shaft 11 in a direction away from the collar 13. The spring 14 is of sufficient strength only to slide the disk 12 rearwardly when such sliding is unopposed by any force exerted in the opposite direction.

Another collar 15 surrounds the shaft 11 and is fixed to the disk 12. The collar 15 is provided with an annular groove 16 in which one of the end convolutions of a spiral spring 17 rides freely in such manner as to not interfere with the rotation of the shaft 11 and disk 12 independently of said spring 17 but not permitting longitudinal movement of said spring 17 independently of the disk 12. The opposite end of the spiral spring 17 rides freely, in similar manner, in an annular groove 18 in a loosely fitting collar 19 surrounding the shaft 11.

The collar 19 is provided with a second annular groove 20 wherein pins or stubs 21, forming the ends of a fork 22, ride freely. The fork 22 is carried by a lever 23 which pivots upon a pin 24 and terminates at its upper end in a foot pedal 25 which passes through a slot 26 in the floor of the automobile.

The spring 17 is considerably stronger than the opposing spring 14, so that the spring 17 will, when compressed, exert pressure sufficient to overcome the oppositely directed pressure of the spring 14 and develop considerable further pressure to force the disk 12 into frictional contact with the friction wheels 27 and 28.

The friction wheel 27 is keyed upon a shaft 29 in such manner that it is slidable upon that shaft longitudinally of said shaft but rotatable only with the shaft 29. The shaft 29 is journaled in the frame 30 at each of its ends. The friction wheel 27 is provided with an annular groove 31 in its periphery and a band of frictional material 32, such as rubber, leather or the like, surrounds the wheel 27 in this groove 31.

A bevel gear 33 is fixed to the shaft 29 at or near the center of said shaft and engages another bevel gear 34 fixed to a shaft 35 at right angles to the shaft 29. The shaft 35 is journaled in an extension 36 of the frame 30 and is adapted to be operatively connected to the mechanism to be driven. This shaft 35 is shown broken away at one end in Figures 1 and 4.

The shaft 29 is provided for a portion of its length with threads 37 and these engaged with internal threads in a wide shanked bevel gear wheel 38.

A slidable frame 39 surrounds the shaft 29 and maintains the bevel gear wheel 38 and the friction gear wheel 28 in fixed position to each other relative to their longitudinal movement upon the shaft 29. A small bevel gear wheel 40 is fixed to a shaft 41 which is journaled in the slidable frame 39 and the bevel gear wheel 40 engages with the bevel gear wheel 38 and with another bevel gear wheel 42 which is fixed to the friction gear wheel 28. The slidable frame 39 is adapted to move longitudinally of the shaft 29 and is held against rotation with said shaft 29 by means of its slidable connection with a guide member 43 secured to the frame 30 by means of screws 44.

An arm 45 is carried by the slidable frame 39 and this arm 45 has a portion 46 bent at right angles to the balance of said arm and provided with rack teeth 47. The rack teeth 47 engage the teeth of a gear wheel 48 which is rotable upon the shaft 11 and independently of said shaft 11. The gear wheel 48 is held against longitudinal movement upon the shaft 11 by means of the collar 13 and another collar 13'.

The friction wheel 27 is provided with an extended hub 49 having an annular groove 50 therein. An arm 51 terminates at one of its ends in a forked portion 52 filling into the annular groove 50 in such manner as not to interfere with the free rotation of the friction wheel 27 but locking the arm 51 and the friction wheel 27 together for longitudinal movement relative to the shaft 29. A track 53 formed in the extension 36 of the frame 30 holds the arm 51 against rotation with the shaft 29 by means of the opposite arms of the forked portion 52 being placed upon opposite sides of the track 53, which arrangement does not, however, interfere with the longitudinal movement of the arm 51 relative to the shaft 29. A portion 54 of the arm 51 is bent at right angles to the balance of the arm 51 and is provided with rack teeth 55 which engage with the teeth of the gear wheel 48 upon the side opposite to that engaged by the rack teeth 47.

In operation, the shaft 11 is assumed to be driven by the engine or motor, carrying with it in rotation the friction disk 12. Pressure upon the foot pedal 25 causes the lever 23 to transmit sliding movement to the collar 19, compressing the spring 17 and forcing the friction disk 12 into frictional engagement with the friction wheels 27 and 28. The intensity of the pressure of the friction disk 12 against the peripheries of the friction wheels 27 and 28 is regulated by the degree of depression of the pedal 25 and consequent degree of compression of the spring 17.

Rotary motion of the friction disk 12 is transmitted to the friction wheel 27 and to the shaft 29. This rotary motion is further transmitted from the shaft 29 to the shaft 35 through the engagement of the bevel gears 33 and 34.

The friction wheel 28 is spaced on the shaft 29 in such manner that it contacts with the friction disk 12 at a slightly lesser distance from the center of the disk 12 than the point of contact of the friction gear 27, causing the friction wheel 28 to be driven slightly slower than the friction wheel 27.

The rotary motion of the friction wheel 28, which is in the opposite direction to that of the friction wheel 27 is transmitted to the bevel gear wheel 38 by means of the bevel gear wheel 40, which also changes the direction of rotation and causes the bevel gear wheel 38 to rotate in the same direction as the friction wheel 27. Through the engagement of the internal threads of the bevel gear wheel 38 with the threaded portion 37 of the shaft 29, the bevel gear wheel 38 will tend to travel downward upon the shaft 29 as long as the rotary speed of the friction wheel 28 is less than the rotary speed of the friction wheel 27 and of the shaft 29. In travelling or screwing downward upon the shaft 29, the bevel gear wheel 38 carries with it the slidable frame 39 and friction wheel 28 by reason of the confinement of these members within the frame 39. Since the arm 45 is integral with the slidable frame 39, the arm is carried downward with the slidable frame 39 and the rack teeth upon the right angle portion 46 of the arm 45 rotate the gear wheel 48. This rotation of the gear wheel 48 causes the right angled portion 54 of the arm 51 to be moved upwardly, through that engagement of the rack teeth 55 with the teeth of the gear wheel 48, a distance equal to the downward movement of the bevel gear wheel 38. Through the engagement of the forked portion 52 of the arm 51 with the annular groove 50 in the hub 49 of the friction wheel 27, the friction wheel 27 is moved upwardly with the arm 51. Therefore, it will be seen that the longitudinal movements upon the shaft 29 of the friction wheels 27 and 28 are always of equal degrees but in opposite directions.

The friction gear wheel 28 will continue to move downwardly upon the shaft 29, and away from the center of the friction disk 12, while the friction gear 27 correspondingly moves away from the center of the disk 12, until a point is reached where the resistance offered to the rotation of the shaft 35 is greater than the frictional adherence of the friction wheel 27 to the friction disk 12. When this point is reached, the friction wheel 27 will begin to slip and will no longer be driven positively by the friction disk 12. This slippage will be only partial but will be sufficient to bring the rotary speed of the friction wheel 27 down to the rotary speed of the friction wheel 28, the friction wheel 28 continuing to be positively driven by the friction disk 12 since the friction wheel 28 has no load resisting its rotation as the friction wheel 27 has. Therefore, whenever a point is reached where the resistance to the rotation of the friction wheel 27 is sufficient to cause a slippage of said friction wheel 27, during a rotation of the friction disk 12, equal to the difference between the normal rotary speeds of the friction wheels 27 and 28, the friction wheels 27 and 28 will both be rotated at the same speed and in the same direction, so there will be no screwing or unscrewing action between the threads 37 on the shaft 29 and the internally threaded bevel gear wheel 38, and, hence no longitudinal movement of either of the said friction wheels upon the shaft 29.

When, however, additional resistance is offered to the rotation of the friction wheel 27, as when a rougher road or a steeper grade is reached, the friction wheel 27 will slip still more and will then become slower in rotation than the unresisted friction wheel 28. Then, the friction wheel 28 will begin to climb upward upon the slower rotating shaft 29 through the engagement of the internal threads of the bevel gear wheel 38 and the threads 37 on the shaft 29. As the friction wheel 28 thus moves towards the rotational center of the friction disk 12, the friction wheel 27 is also moved a corresponding distance toward said center, and this movement will continue until the friction wheel 27 reaches a point of sufficiently short distance from the said center that the increasing leverage thus provided enables it to rotate against the offered resistance with a degree of slippage not greater than the difference between its normal rotary speed and the normal rotary speed of the friction wheel 28. Should a further resistance be encountered, this same movement of the friction wheels 27 and 28 toward the center of rotation of the friction disk 12 will be continued further.

When the resistance to the rotation of the friction wheel 27 becomes diminished, as when the level is reached after climbing a grade or a smoother road or gentler grade encountered, the slight slippage of the friction wheel 27 will either cease or become reduced, and the shaft 29 will then rotate slightly faster than the friction wheel 28. Hence, the friction wheel 28 will be moved away from the center of rotation of the friction disk 12 through the engagement of the threads 37 upon the shaft 29 and the internal threads of the bevel gear wheel 38. As the friction wheel 27 is moved away from the said center a corresponding distance at the same time, it will reach a point where its slippage will just equalize its rotary speed with that of the friction wheel 28, and longitudinal movements of the friction wheels 27 and 28 will then cease until a change in the resistance to the rotation of the friction wheel 27 occurs, when one or the other of the described operations will take place to reestablish equality.

It will thus be seen that an automatic adjustment of the transmission mechanism is provided by my invention, whereby a given rotary speed of a driving shaft is automatically transmitted to the driven mechanism at speeds varying inversely with the changing power requirements of the driven mechanism. Thus, in an automobile, for intance, the driver may regulate the speed of his vehicle entirely by the use of the throttle valve or accelerator without any attention to the transmission since the transmission will be always automatically set to give the greatest speed to the drive wheels, in proportion to the speed of the motor, compatible with the power requirements of the said drive wheels at any time or under any of the constantly changing running conditions.

When, however, it is desired to manually regulate the transmission this may be accomplish by varying the pressure of the friction disk 12 against the friction wheels 27 and 28. Pressure upon the foot pedal 25 causes the lever 23 to move the collar 19 along the shaft 11 toward the friction disk 12 and to compress the spiral spring 17. The degree of pressure determines the degree of compression of the spring 17 and this, in turn, determines the pressure of the friction disk 12 against the peripheries of the friction wheels 27 and 28. Since the degree of this last named pressure determines the frictional cohesion between the frictionally engaging gears, it is evident that this gives manual control of the transmission without interfering with the operation of the automatic control means.

My invention also eliminates the necessity of a separate clutch mechanism. By simply removing all pressure from the foot pedal 25, the collar 19 is retracted along the shaft 11 away from the friction disk 12, relieving all compression of the spring 17 and slightly retracting that spring. When freed of the opposing pressure of the spring 17, the spring 14 forces the friction disk 12 away from and out of contact with the friction wheels 27 and 28, thus instantly breaking the driving connection between the motor and the driven mechanism. Contrawise, pressure upon the foot pedal 25 forces the friction disk 12 into contact with the friction wheels 27 and 28 and reestablishes operative connection between the motor and the driven mechanism.

Having described my invention, I claim:

1. In friction transmission mechanism, the combination of a driving friction disk, a rotatable shaft, a friction wheel feathered upon the said shaft and engaging frictionally the said friction disk, a second friction wheel rotatable upon the said shaft and frictionally engaging the said friction disk upon the opposite side from the center of said friction disk from that engaged by the said first named friction wheel, means adapted to cause the said section friction wheel to move radially of the said friction disk and toward the center of said friction disk whenever there is any slippage in the frictional drive between the said friction disk and the said first named friction wheel and to move radially of the said friction disk and away from the center of said disk whenever there is no slippage in the frictional drive between the said friction disk and the said first named friction wheel, a gear wheel, racks engaging opposite sides of the said gear wheel, an arm connecting one of said racks to the said second friction wheel to control the longitudinal movement of said second friction wheel without interference with its rotary motion, and an arm connecting the other of said racks to the said first named friction wheel to control the longitudinal movement of said first named friction wheel without interference with its rotary motion.

2. In friction transmission mechanism, the combination of a driving shaft, a driven shaft, a friction member, and means controlled by the slippage of said friction member for varying the rotary speed ratio of the said driven shaft to the said driving shaft.

3. In friction transmission mechanism, the combination of a driving shaft, a driven shaft, a friction member, and means controlled by the varying degrees of slippage of the said friction member under varying degrees of resistance offered to the rotation of the said driven shaft for automatically varying the rotary speed ratio of the said driven shaft to that of the said driving shaft in such manner as to constantly deliver to the said driven shaft torque in proportion to the resistance offered to the rotation of the said driven shaft and rotary speed in inverse proportion to the resistance offered to the rotation of the said driven shaft.

4. In friction transmission mechanism, the combination of a friction driving member, a rotatable threaded shaft provided with a keyway, a friction wheel feathered upon said shaft and slidable longitudinally thereon, and means controlled by the degree of slippage of the said friction wheel under resistance offered to the rotation of the said shaft for moving the said friction wheel longitudinally of and upon the said shaft in one direction when the said resistance and said slippage increase and in the opposite direction when the said resistance and said slippage decrease.

5. In friction transmission mechanism, the combination of a rotatable friction driving member, a rotatable threaded shaft provided with a keyway longitudinally thereof, a friction wheel feathered upon said shaft and slidable longitudinally thereon in continuous frictional engagement with the said friction driving member, an internally threaded friction wheel spirally movable upon the said shaft through engagement of its internal threads with the threads of said shaft and in frictional engagement with the said friction driving member and rotatable thereby at a slightly lesser rotary speed than the normal rotary speed of the said first mentioned friction wheel, and means whereby the spiral movement of the said internally threaded friction wheel upon the said shaft toward the axis of rotation of the said friction driving member will cause a corresponding sliding movement of the said first mentioned friction wheel upon the said shaft toward the axis of rotation of the said friction driving member and whereby the spiral movement of the said internally threaded friction wheel upon the said shaft away from the axis of rotation of the said friction driving member will cause a corresponding sliding movement of the said first mentioned friction wheel upon the said shaft away from the axis of rotation of the said friction driving member.

6. In friction transmission mechanism, the combination of a driving friction member, a rotatable threaded shaft provided with a keyway longitudinally thereof, an internally threaded member adapted to be rotated through frictional engagement with said friction driving member and to spiral toward the axis of rotation of the said friction driving member whenever the rotary speed of said internally threaded member exceeds the rotary speed of the said shaft and to spiral toward the circumference of the said friction driving member whenever the rotary speed of the said shaft exceeds the rotary speed of the said internally threaded member, a friction driven wheel feathered upon the said shaft and rotatable by the said friction driving member at a speed normally somewhat in excess of a rotary speed of the said internally threaded member, and means adapted to cause the said internally threaded member and the said friction wheel to move longitudinally of and upon the said shaft in unison so that both the said friction wheel and the said internally threaded member will approach the axis of rotation of the said friction driving member or recede from said axis in the same degrees.

7. In friction transmission mechanism, the combination of a driving friction member, a friction wheel engaging the said driving friction member and rotatable thereby and movable radially of the said driving friction member, means for moving the said friction wheel toward the periphery of the said driving friction member while the said friction wheel maintains frictional engagement with the said driving friction member with less than a given degree of slippage in such engagement, and means for moving the said friction wheel toward the axis of rotation of the said driving friction member while the slippage of the said friction wheel in its frictional engagement with the said driving friction member exceeds the said given degree.

8. In friction transmission mechanism, the combination of a rotatable driving friction disk, a friction wheel engaging said friction disk and rotatable thereby and movable radially of said friction disk while maintaining frictional engagement therewith, and means controlled by the slippage of said friction wheel for causing movement of the said friction wheel radially of the said friction disk.

9. In friction transmission mechanism, the combination of a rotatable driving friction disk, a friction wheel engaging the said friction disk for rotation thereby and movable radially of the said friction disk while maintaining frictional engagement therewith, a driven shaft rotatable by the said friction wheel, and means controlled by the degree of slippage of said friction wheel in its frictional engagement with the said friction disk under varying degrees of resistance offered to the rotation of the said driven shaft for causing movement of the said friction wheel radially of the said friction disk.

10. In friction transmission mechanism, the combination of a rotatable driving friction disk, a friction wheel engaging the said friction disk for rotation thereby and movable radially of the said friction disk while maintaining frictional engagement therewith, a shaft mounting the said friction wheel to be movable longitudinally thereof and thereon and rotatable by and with the said friction wheel, a rotatable member mounted for independent rotation upon said shaft and normally rotating at lesser speed than the said friction wheel and said shaft, means for causing the said friction wheel to travel upon the said shaft radially of the said friction disk and toward the periphery thereof with a speed proportional to the excess of its rotary speed over the rotary speed of the said rotatable member and to travel upon the said shaft radially of the said friction disk and toward the axis thereof whenever the rotary speed of the said friction wheel becomes less than the rotary speed of the said rotatable member through slippage of the said friction wheel in its frictional engagement with the said friction disk, and means controlled by the degree of resistance offered to the rotation of the said shaft for causing the said friction wheel to slip in varying degrees in its frictional engagement with the said friction disk.

11. In friction transmission mechanism, the combination of a rotatable driving friction disk, a friction wheel engaging the said friction disk for rotation thereby and movable radially thereof while maintaining frictional engagement therewith, means for normally causing the said friction wheel to move radially of the said friction disk and toward the periphery thereof, and means controlled by the degree of slippage of the said friction wheel in its frictional engagement with the said friction disk for regulating the speed of the movement of the said friction wheel toward the periphery of the said friction disk or for causing the said friction wheel to remain stationary in radial relation to the said friction disk or to travel radially of the said friction disk and toward the axis of said friction disk.

12. In friction transmission mechanism, the combination of two rotatable members mounted upon a shaft and adapted to be rotated independently of each other and means controlled by the differences in the rotary speeds of the said rotatable members for moving said rotatable members longitudinally of and upon the said shaft.

13. In friction transmission mechanism, the combination of a friction driving member, a friction driven member, a shaft driven by said friction driven member, a second friction driven member, and means controlled by variations in speed between the two said friction driven members for varying the ratio of the rotary speed of the said shaft to the rotary speed of the said friction driving member in inverse proportion to the degree of resistance offered to the rotation of the said shaft.

14. In friction transmission mechanism, the combination of a driving shaft, a friction driving disk carried by said driving shaft, a friction wheel, a driven shaft rotatable with said friction wheel, a second friction wheel, and means controlled by variations in the speeds of the two said friction wheels relative to each other for maintaining the ratio of the speed of the said driven shaft to the speed of the said driving shaft inversely proportional to the degree of resistance offered to the rotation of the said driven shaft.

15. In friction transmission mechanism, the combination of a driving shaft, a friction driving disk carried by said driving shaft, a friction wheel engaging said friction driving disk and rotatable thereby, a driven shaft rotatable with said friction wheel, a second friction wheel engaging the said friction driving disk and rotatable thereby, and automatically acting means controlled by variations in the speeds of the two said friction wheels relative to each other for so varying the ratio of the speed of the said driven shaft to the speed of the said driving shaft as to maintain the said ratio inversely proportional to the degree of resistance offered to the rotation of the said driven shaft.

16. In friction transmission mechanism, the combination of a driving shaft, a friction disk carried by said shaft, a friction wheel adapted to be driven by said friction disk and to normally slip in its engagement with said disk to a determined degree, and means controlled by variations in the degree of slippage of said friction wheel above or below the said determined degree for varying the ratio of the rotary speed of a driven shaft to the rotary speed of the said driving shaft in inverse proportion to variations in the degree of resistance offered to the rotation of the said driven shaft.

17. In friction transmission mechanism, the combination of a driving shaft, a driven shaft, a friction driving disk carried by said driving shaft, a friction wheel engaging with and rotatable by said friction driving disk, a second friction wheel engaging with and rotatable by said friction driving disk at speeds normally differing somewhat from the speeds at which the first named friction wheel is rotated, and means controlled by the degree of slippage of the said second friction wheel in its engagement with the said friction driving disk for varying the ratio of the rotary speed of the said driven shaft to the rotary speed of the said driving shaft in inverse proportion to variations in the degree of resistance offered to the rotation of the said driven shaft.

CHARLES H. GILL.